(12) United States Patent
Bidner et al.

(10) Patent No.: US 6,889,132 B2
(45) Date of Patent: May 3, 2005

(54) VEHICLE DRIVE CONTROL FOR 4×4 MODE

(75) Inventors: David Karl Bidner, Livonia, MI (US); Dennis Allen Light, Monroe, MI (US); Michael John Cullen, Northville, MI (US); Ralph Wayne Cunningham, Milan, MI (US); Richard John Hippley, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 270 days.

(21) Appl. No.: 09/775,279

(22) Filed: Feb. 1, 2001

(65) Prior Publication Data

US 2002/0143455 A1 Oct. 3, 2002

(51) Int. Cl.[7] ............................... G06F 7/00; B60K 1/00
(52) U.S. Cl. ............................... 701/89; 701/1; 477/107
(58) Field of Search .................. 701/1, 89; 477/107, 477/116, 117, 124, 35, 36, 110, 120, 904; 475/206, 303, 204, 208, 221, 295, 202, 222

(56) References Cited

U.S. PATENT DOCUMENTS

| | | | | |
|---|---|---|---|---|
| 4,703,428 A | | 10/1987 | Hosaka et al. ............ 364/424.1 |
| 4,715,467 A | * | 12/1987 | Sakai ......................... 180/247 |
| 5,241,855 A | | 9/1993 | Cullen et al. ............... 73/117.3 |
| 5,262,950 A | * | 11/1993 | Nakayama .............. 364/424.05 |
| 5,522,776 A | * | 6/1996 | Alvey ......................... 477/35 |
| 5,695,022 A | * | 12/1997 | Zalewski et al. ............ 180/249 |
| 5,819,194 A | * | 10/1998 | Hara et al. .................... 701/89 |
| 5,853,342 A | * | 12/1998 | Pritchard et al. ............ 475/206 |
| 5,855,533 A | * | 1/1999 | Tolkacz et al. .............. 477/110 |
| 5,873,801 A | * | 2/1999 | Taga et al. ...................... 477/5 |
| 5,890,986 A | * | 4/1999 | Pritchard et al. ............ 475/206 |
| 5,988,307 A | * | 11/1999 | Yamada et al. .............. 180/243 |
| 6,044,318 A | | 3/2000 | Bourdon et al. ............... 701/65 |
| 6,142,907 A | * | 11/2000 | Minowa et al. ................. 477/5 |
| 6,146,308 A | * | 11/2000 | Taniguchi et al. ............. 477/48 |
| 6,158,303 A | * | 12/2000 | Shiraishi et al. ........... 74/665 T |
| 6,213,242 B1 | * | 4/2001 | Rodrigues et al. ........... 180/249 |
| 6,251,045 B1 | * | 6/2001 | Oliveira et al. .............. 477/124 |
| 6,319,170 B1 | * | 11/2001 | Hubbard et al. ............. 477/107 |
| 6,549,840 B1 | * | 4/2003 | Mikami et al. ................ 701/69 |

* cited by examiner

Primary Examiner—Tan Q. Nguyen
Assistant Examiner—Dalena Tran
(74) Attorney, Agent, or Firm—Ford Global Technologies, LLC

(57) ABSTRACT

Method and electronic control system using a unique driver demand (calibration) table stored in system memory to provide torque output values specific to a 4×4 mode of operation of the vehicle drive unit. For example, the torque output of the electronic control system for a 4×4 low mode of operation is controlled using a unique calibration table stored in system memory for 4×4 low mode of operation, while the torque output of the electronic control system for other modes of operation is controlled using one or more different, other calibration tables stored in system memory.

11 Claims, 3 Drawing Sheets

TABLE 1. AUTO, DRIVE OR OVERDRIVE, 4x4L NOT ACTIVE

| PEDAL POSITION (FOOT ANGLE DEGREES (BELOW) | ← | ← | OUTPUT SHAFT TORQUE (Nm) | → | → |
|---|---|---|---|---|---|
| 20 | 400 | 400 | 300 | 200 | 100 |
| 15 | 350 | 350 | 250 | 150 | 80 |
| 10 | 300 | 300 | 200 | 100 | 60 |
| 5 | 150 | 150 | 100 | 50 | 30 |
| 0 | 0 | 0 | 0 | 0 | 0 |
| OUTPUT SHAFT SPEED (RPM) → | 0 | 150 | 500 | 750 | 1000 |

TABLE 1. AUTO, DRIVE OR OVERDRIVE, 4x4L NOT ACTIVE

| PEDAL POSITION (FOOT ANGLE DEGREES (BELOW) | ← | — | OUTPUT SHAFT TORQUE (Nm) | — | → |
|---|---|---|---|---|---|
| 20 | 400 | 400 | 300 | 200 | 100 |
| 15 | 350 | 350 | 250 | 150 | 80 |
| 10 | 300 | 300 | 200 | 100 | 60 |
| 5 | 150 | 150 | 100 | 50 | 30 |
| 0 | 0 | 0 | 0 | 0 | 0 |
| OUTPUT SHAFT SPEED (RPM) → | 0 | 150 | 500 | 750 | 1000 |

FIG. 2A

TABLE 2. MANUAL TRANS. ALL BUT PARK, 4x4L NOT ACTIVE OR AUTO TRANS, ALL GEARS EXCEPT D, OD, PARK OR NEUTRAL, 4x4L NOT ACTIVE

| PEDAL POSITION (FOOT ANGLE DEGREES (BELOW) | ← | — | ENGINE OUTPUT TORQUE (Nm) | — | → |
|---|---|---|---|---|---|
| 20 | 100 | 110 | 120 | 120 | 100 |
| 15 | 90 | 92 | 96 | 96 | 90 |
| 10 | 70 | 72 | 76 | 76 | 60 |
| 5 | 30 | 32 | 36 | 36 | 30 |
| 0 | 0 | 0 | 0 | 0 | 0 |
| ENGINE SPEED (RPM) → | 500 | 1500 | 2500 | 4000 | 6000 |

FIG. 2B

TABLE 3. AUTO, DRIVE OR OVERDRIVE, 4x4L ACTIVE

| PEDAL POSITION (FOOT ANGLE DEGREES (BELOW) | ← | — | OUTPUT SHAFT TORQUE (Nm) | — | → |
|---|---|---|---|---|---|
| 20 | 400 | 400 | 300 | 200 | 100 |
| 15 | 225 | 225 | 200 | 120 | 60 |
| 10 | 150 | 150 | 100 | 80 | 40 |
| 5 | 75 | 75 | 50 | 40 | 20 |
| 0 | 0 | 0 | 0 | 0 | 0 |
| OUTPUT SHAFT SPEED (RPM) → | 0 | 150 | 500 | 750 | 1000 |

FIG. 2C

TABLE 4. MANUAL TRANS, ALL BUT PARK OR NEUTRAL, 4x4L ACTIVE

| PEDAL POSITION (FOOT ANGLE DEGREES (BELOW)) | | | ENGINE OUTPUT TORQUE (Nm) | | |
|---|---|---|---|---|---|
| 20 | 100 | 110 | 120 | 120 | 100 |
| 15 | 55 | 55 | 60 | 60 | 55 |
| 10 | 35 | 35 | 40 | 40 | 35 |
| 5 | 15 | 15 | 20 | 20 | 15 |
| 0 | 0 | 0 | 0 | 0 | 0 |
| ENGINE SPEED (RPM) | 500 | 1500 | 2500 | 4000 | 6000 |

FIG. 2D

TABLE 5. MANUAL OR AUTO TRANS, PARK OR NEUTRAL

| DESIRED ENGINE SPEED OVER IDLE SPEED | 0 | 500 | 1000 | 1500 | 2000 |
|---|---|---|---|---|---|
| PEDAL POSITION (FOOT ANGLE DEGREES) | 0 | 5 | 10 | 15 | 20 |

FIG. 2E

VEHICLE DRIVE CONTROL FOR 4×4 MODE

BACKGROUND OF THE INVENTION

1. Field of the Invention

The present invention relates to an electronic control system and method for controlling a torque output of a vehicle drive in a manner that is less sensitive to accelerator pedal position when the vehicle drive is in a 4×4 mode of operation.

2. Description of Related Art

Motor vehicle internal combustion engines may be controlled using a torque control scheme where actual engine torque is controlled to a desired engine torque through an input adjusting device, such as with the electronic throttle, ignition timing, air-fuel ratio, or various other devices.

A torque-based electronic throttle (ETC) driver demand control system has been developed for use with all-wheel drive vehicles with manual and automatic transmissions. The ETC driver demand control system has employed a calibration table to provide a desired output torque in response to inputs to the table. For manual transmission applications, the inputs to the calibration table have been the engine speed and accelerator pedal position. For automatic transmission applications, the inputs to the calibration table have been the transmission output shaft speed and accelerator pedal position.

In manual transmission applications, the calibration table having inputs of engine speed and accelerator pedal position has been used to provide a wheel torque output in response to driver demand, regardless of whether the motor vehicle is operating in one of the normal drive gear modes or in a 4×4 low mode. In automatic transmission applications, the calibration table having inputs of transmission output shaft speed and accelerator pedal position has been used to provide a transmission output shaft torque in response to driver demand, regardless of whether the motor vehicle is operating in one of the normal drive gear modes or in a 4×4 low mode. Use of a calibration table in such a manner produces torque outputs that are distorted during operation of the vehicle drive in different modes as a result of the need to account for the 4×4 low mode of operation and also the normal drive gear modes of operation. For example, the wheel torque (manual transmission) or output shaft torque (automatic transmission) can be overly sensitive to accelerator pedal position when the vehicle drive is operated in the 4×4 low mode.

An object of the present invention is to provide an electronic control system and method for controlling a vehicle drive in a manner to overcome this problem of distortion and over-sensitivity of torque outputs to the position of the accelerator pedal when the vehicle drive is operated in a 4×4 mode.

SUMMARY OF THE INVENTION

The present invention provides pursuant to an illustrative embodiment an electronic control system and method using a unique calibration table indicating a relationship of torque output as a function of accelerator pedal position and a speed parameter, such as engine or transmission output shaft speed, to provide torque output values specifically applicable to a 4×4 mode operation of the vehicle drive, such as for example only a 4×4 low mode of operation. For example, the present invention provides an electronic control system and method using a unique calibration table stored in control memory to control torque output values appropriate for the 4×4 low mode of operation of the vehicle drive unit. When the vehicle is operated in one of the other modes of operation, the control system uses a different stored calibration table indicating a different relationship of torque output as a function of the accelerator pedal position and the speed parameter appropriate to that mode of operation.

In an automatic transmission application with the 4×4 low mode operable (active), a unique stored "4×4 low" calibration table is provided that renders the output shaft torque values less sensitive to the accelerator pedal position when the automatic transmission selector is placed in a drive "D" or overdrive "OD" mode.

In a manual transmission application with the 4×4 low mode operable (active), a unique stored "4×4 low" calibration table is provided that renders the engine torque output values less sensitive to the accelerator pedal position when the manual transmission selector is placed in gears other than park or neutral.

The present invention is advantageous to provide improved vehicle control and driver feel when the vehicle drive is in a 4×4 mode of operation so that the output torque is less sensitive to accelerator pedal position. The above objects and advantages of the present invention will become more readily apparent from the following description taken with the following drawings.

BRIEF DESCRIPTION OF THE DRAWINGS

FIGS. 2A, 2B, 2C, 2D are stored calibration tables that indicate a relationship of output torque as a function of accelerator pedal position (accelerator foot pedal angle) and a speed parameter (output shaft rpm or engine rpm) and that can be used in practice of an illustrative embodiment of the invention.

FIG. 2E is a calibration table indicating a relationship of accelerator pedal position and desired engine speed over idle speed.

DETAILED DESCRIPTION OF THE PREFERRED EMBODIMENT

Figure 1:
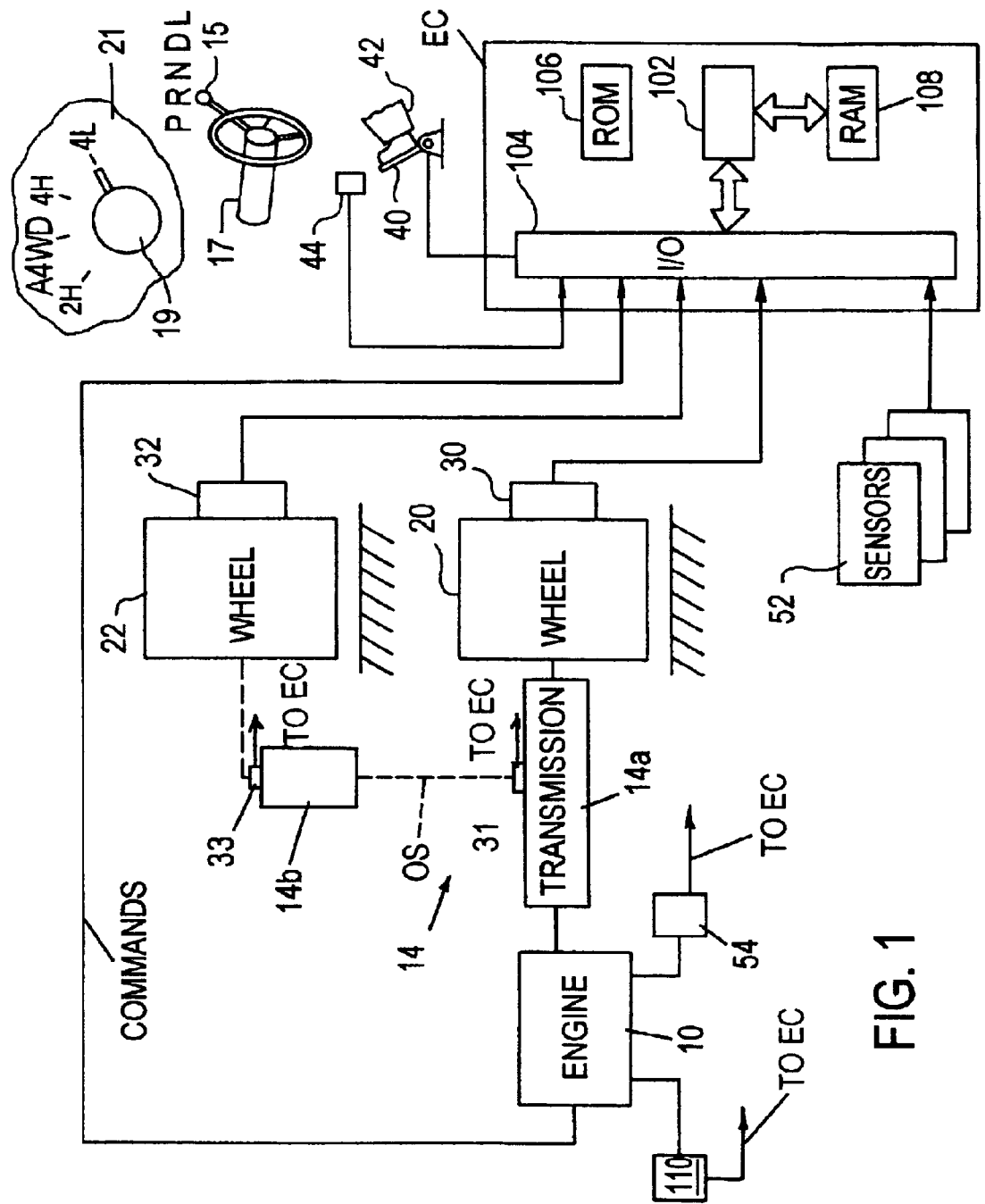
FIG. 1 is a block diagram of a vehicle illustrating various components related to the present invention.

Referring to FIG. 1, an internal combustion engine 10 of a motor vehicle is shown coupled to a vehicle drive 14 that includes a conventional manual or automatic transmission 14a and a conventional transfer case 14b. The engine 10 can be coupled to the transmission 14a in conventional manner and has a torque output and a rpm output applied to transmission 14a. Transmission 14a is coupled to a first set of drive wheels 20 and can be coupled to transfer case 14b and in turn to a second set of drive wheels 22 when demanded by the vehicle driver to provide on all wheel (4-wheel) drive operation. The transmission 14a can comprise a manually actuated gear set of a manual transmission, a combined gear set and torque converter of an automatic transmission, a continuously variable transmission, or any other drive unit known to those skilled in the art.

A manual transmission 14a is operable by the vehicle driver using a conventional transmission shifter 15 shown for convenience disposed on steering column 17 but more typically disposed on a vehicle floor console (not shown), or elsewhere in the vehicle, to manually shift among forward drive gears, 1, 2, 3, 4, etc. and reverse. An automatic transmission 14a is operable by the vehicle driver using a conventional transmission shifter 15 that can be placed, for example, in a park ("P"), reverse ("R"), neutral ("N"), drive ("D"), or low ("L") selector position in conventional manner. Additional transmission selections such as drive gear 3, 2, 1, etc. also can be provided on the transmission shifter selector as is known.

The transfer case 14b is drivingly coupled to the second set of drive wheels 22 when demanded by the vehicle driver to provide on all wheel (4-wheel) drive. The transfer case 14b is electrically controlled by selector switch 19, for example only, located on the dashboard 21 of the vehicle to permit the driver to select a particular 4-wheel drive mode of operation. For example only, the driver can select among all-wheel 4×4 mode ("A4WD"), 4×4 high mode ("4H"), and 4×4 low mode ("4L"). The "A4WD" mode is an optional mode of operation selectable by the vehicle driver and is controlled by electronic controller EC to automatically provide a 4×4 mode of operation (e.g. the "4H" mode of operation) when a certain amount of slippage is detected at the wheels 20 and/or 22. Otherwise, the electronic controller EC will command the "2H" mode of operation described below. Wheel slippage is detected by comparing speed signals from first wheel speed sensor 30 for the first set of drive wheels 20 and/or from second wheel speed sensor 32 for the second set of drive wheels 22. The wheel speed sensors 30, 32 are used in conjunction with the "A4WD" mode and are not necessary if the "A4WD" mode is not provided as an available mode of operation of the drive unit.

The "4L" mode of operation is a driver-selected and controlled mode of all wheel drive operation typically operable at relatively low vehicle speeds than the "4H" mode. For example, the "4L" mode of operation typically is used for operation of the vehicle in deep mud, deep snow, rough rocky terrain, or pulling heavy loads such as for example only pulling out tree stumps. The "4H" mode of operation is a driver-selected and controlled mode of all wheel drive operation typically operable at relatively higher vehicle speeds than those of the "4L" mode. Such all-wheel drive settings are used on the Lincoln Navigator sport utility vehicle manufactured by the Ford Motor Company for example. The "2H" selector setting shown provides a two wheel drive mode of operation where transmission 14a is coupled only to wheels 20.

An accelerator pedal 40 is shown communicating with the driver's foot 42. Accelerator pedal position is measured by one or more pedal position sensors 44 (one shown for convenience) and sent to electronic controller EC. The pedal position sensor 44 can comprise a conventional brush type of position sensor, or other suitable position sensor.

Electronic controller EC receives various signals from sensors coupled to the engine 10, transmission 14a, transfer case 14b, and the vehicle. These sensors include an output shaft speed sensor 31 to sense the rotational speed (rpm) of the output shaft OS of the transmission 14a and a 4×4 mode switch sensor 33 to sense the position of switch 19. The sensors also can include first wheel speed sensor 30 for the first set of drive wheels 20 and second wheel speed sensor 32 for the second set of drive wheels 22 if the "A4WD" mode is provided as an available mode of operation of the drive unit. The wheel speed sensors 30, 32 can comprise conventional Hall effect rotation sensors. An engine sensor 54 is provided to sense rpm of the engine 10 and can comprise a conventional Hall effect rpm sensor. Other sensors 52 (shown schematically) can be provided to sense engine coolant temperature, air charge temperature, transmission oil temperature and other variables.

Electronic controller EC is a conventional microcomputer including a microprocessor unit 102, input/output ports 104, electronic read only (ROM) memory chip 106, which is an electronically programmable memory in this particular example, random access memory (RAM) 108, and conventional data bus line.

Controller EC is shown controlling the engine 10, the transmission 14a, and transfer case 14b, although the invention is not so limited since the engine, the transmission, and the transfer case each can be controlled by an individual electronic controller or the engine and transmission can be controlled by an electronic controller while the transfer case is controlled by its own electronic controller. In a particular embodiment, the engine 10 is electrically controlled by an electronic throttle control (ETC) system 110 interfaced with electronic controller EC. In such an electronic throttle control system for a vehicle with an automatic transmission, the engine 10, transmission 14a, and transfer case 14b are controlled in response to the accelerator pedal position and the transmission output shaft speed, with modifications for barometric pressure (BP) and engine coolant temperature (ECT) and air charge temperature (ACT), to produce a desired (driver demanded) output shaft torque value. The ETC system 110 can be of the type described in copending application Ser. No. 09/532,685 filed Jan. 21, 2000, the teachings of which are incorporated herein by reference. As discussed in the Background Information above, the output shaft torque of such ETC system can be overly sensitive to accelerator pedal position when the vehicle drive is operated in the 4×4 low mode as a result of use of a particular calibration table that does not distinguish between the 4×4 low mode of operation versus other modes of operation of the drive unit.

In accordance with an illustrative embodiment of the invention, electronic controller EC embodies in controller memory one or more special calibration tables applicable specifically to the 4×4 low mode of operation ("4L" mode) of the vehicle drive 14, while one or more different, other calibration tables are stored in controller memory and are applicable to other modes of operation of the vehicle drive unit.

For purposes of illustration and not limitation, Driver Demand Tables are set forth below illustrating five (5) stored calibration tables pursuant to an illustrative embodiment the invention for use in connection with manual transmission and automatic transmission embodiments of the invention. The calibration tables 1–4 indicate a relationship of output torque (output shaft torque or engine torque) as a function of accelerator pedal position (pedal foot angle degrees) and a speed parameter (output shaft RPM or engine RPM. FIGS. 2A through 2E illustrate the five stored tables listed in the Driver Demand Tables.

---

DRIVER DEMAND TABLES

1) Table of output shaft torque—F(pedal position, output shaft speed) for non-4L mode
2) Table of engine torque—F(pedal position, engine speed) for non-4L mode
3) Table of output shaft torque-F(pedal position, output shaft speed) for 4L mode active
4) Table of engine torque—F(pedal position, engine speed) for 4L mode active
5) Function that outputs engine speed—F(pedal position) for Park and Neutral -continued

APPLICATION COMBINATIONS:

| Trans | 4L Active | PRNDL | Table | Speed In | Torque Out |
|---|---|---|---|---|---|
| Manual | No | All but P, N | 2 | engine | |
| Manual | Yes | All but P, N | 4 | engine | |
| Manual | Yes | P, N | 5 | N/A | N/A |
| Manual | No | P, N | 5 | N/A | N/A |
| Auto | No | D, OD | 1 | OS | |
| Auto | No | All gears but D, OD, P and N | 2 | engine | |
| Auto | Yes | D, OD | 3 | OS | |
| Auto | Yes | All gears but D, OD, P and N | 4 | engine | |
| Auto | Yes | P, N | 5 | N/A | N/A |
| Auto | No | P, N | 5 | N/A | N/A | where Trans is transmission type (manual or automatic), engine is engine speed, OS is output shaft speed and N/A is not applicable.

As is apparent from the Driver Demand Tables, for a manual transmission, the stored calibration tables 2 and 4 are used by the controller EC to determine an engine (crankshaft) torque output value from an accelerator pedal position input and an engine speed input. For example, when the "4L" mode is inactive, stored calibration table 2 is used in all transmission settings, except "P" and "N", by controller EC to provide an engine torque output in dependence on the accelerator pedal position and engine speed (rpm). When the "4L" mode is active, a different stored calibration table 4 is used in all transmission settings, except "P" and "N", to provide an engine (crankshaft) torque output in dependence on the pedal position and engine speed (rpm). Calibration tables 2 and 4 are selected to provide for engine braking when the "4L" mode is active or inactive. Calibration table 4 differs from calibration table 2 to provide a change in engine torque versus position of the accelerator pedal that is more gradual than that provided by table 2; e.g. see FIGS. 2B and 2D. Use of table 4 when the "4L" mode is active renders the engine torque output less sensitive to accelerator pedal position to provide improved vehicle control and driver feel when the vehicle drive 14 is in the "4L" mode of operation, for example, over rough rocky terrain.

When the "4L" mode is active or inactive and the transmission selector is placed in the "P" or "N" mode, stored calibration table 5 shown in FIG. 2E is used by controller EC to provide a desired engine speed over idle speed in dependence on accelerator pedal position. Table 5 is provided to permit the vehicle driver to rev the engine in "P" or "N" to a desired engine speed over idle speed without the controller EC generating engine or output shaft torque values.

As is apparent from the Driver Demand Tables, for an automatic transmission, the stored calibration tables 1 and 3 are used by the controller EC to determine an output shaft torque value from accelerator pedal position input and the output shaft speed input. The output shaft torque is related by the transmission gear ratio and torque converter ratio as a multiplier to engine torque. The output shaft speed is sensed by rpm sensor 31. Vehicle speed is determined from the output shaft speed. The stored calibration tables 1 and 3 are used to determine an output shaft torque value from accelerator pedal position input and output shaft speed (rpm).

For example, when the "4L" mode is inactive with an automatic transmission setting of "D" or "OD" (over-drive if present), stored table 1 is used by controller EC to provide an output shaft torque in dependence on the accelerator pedal position and the output shaft speed (rpm). When the "4L" mode is inactive with the transmission setting in any setting except "D", "OD", "P", and "N", stored table 2 is used to provide an engine output torque in dependence on the accelerator pedal position and the engine speed (rpm).

When the "4L" mode is active with a transmission setting of "D" or "OD", stored calibration table 3 is used by controller EC to provide an output shaft torque in dependence on the a celerator pedal position and the output shaft speed (rpm). When the "4L" mode is active with the transmission setting in any setting except "D", "OD", "P", and "N", stored table 4 is used by controller EC to provide an engine torque output in dependence on the accelerator pedal position and engine speed (rpm). Tables 2 and 4 are selected to provide for engine braking when the "4L" mode is active or inactive and the transmission selector is in any gear except "D", "OD", "P", and "N". Calibration table 3 differs from calibration table 1 in a manner to provide a change in output sh ft torque versus position of the accelerator pedal that is more gradual than that provided by table 1; e.g. see FIGS. 2A and 2C. Us of table 3 when the "4L" mode is active renders the output shaft torque output less sensitive to accelerator pedal position to provide improved vehicle control and driver feel when the vehicle drive 14 is in the "4L" mode of operation, for example, over rough terrain.

When the "4L" mode is active or inactive and the transmission selector is placed in "P" or "N", stored calibration table 5 is used by controller EC to allow the driver to rev the engine in "P" or "N" without generating engine or output shaft torque values.

Although the illustrative embodiments of the invention have been described hereabove with respect to use of one or more special calibration tables for the "4L" mode of operation, those skilled in the art will appreciate that the invention is not so limited and can be practiced using different calibration tables applicable specifically to the "4H" mode of operation as well, whether the "4H" mode is selected by the vehicle driver using switch 19 or by the electronic controller EC in the "A4WD" mode of operation.

Although certain embodiments of the invention have been described herein, the invention is not limited to these embodiments as changes and modifications can be made thereto within the scope of the invention as set forth in the appended claims.

What is claimed is:

1. A method of controlling a vehicle drive having a 4×4 mode of operation and other modes of operation using an electronic control system providing a torque output in response to driver demand, comprising:

controlling torque output of one of an engine and transmission of said vehicle when the vehicle is in the 4×4 mode using a calibration table stored in system memory and indicating a relationship of torque output as a function of accelerator pedal position and a speed parameter for reducing sensitivity of the torque output to accelerator pedal position in the 4×4 mode of operation, and controlling torque output of one of the engine and the transmission of said vehicle when said vehicle is in one of the other modes of operation using a different calibration table stored in system memory and indicating a different relationship of torque output as a function of the accelerator pedal position and the speed parameter.

2. The method of claim 1 wherein for a vehicle drive including an automatic transmission, the torque output of said calibration table comprises a transmission output shaft torque value determined in response to accelerator pedal position and transmission output shaft speed.

3. The method of claim 2 wherein the transmission output shaft torque value is provided for drive gear mode of the transmission.

4. A The method of claim 1 wherein the speed parameter is engine speed for a vehicle drive comprising a manual transmission.

5. The method of claim 1 wherein the speed parameter is transmission output shaft speed for a vehicle drive comprising an automatic transmission.

6. The method of claim 1 wherein the transmission is drivingly coupled to a first set of wheels, a transfer case is optionally drivingly coupled to a second set of wheels, and, in the 4×4 mode of operation, said second set of wheels is driven via said transfer case.

7. A method of controlling a vehicle drive having a 4×4 low mode of operation and other modes operation using an electronic control system providing a torque output in response to driver demand, comprising:

controlling torque output of one of an engine and transmission of said vehicle when the vehicle is in the 4×4 low mode using a calibration table stored in system memory and indicating a relationship of torque output as a function of accelerator pedal position and a speed parameter for reducing sensitivity of torque output to accelerator pedal position in the 4×4 low mode of operation, and controlling torque output of one of the engine and the transmission of said vehicle when said vehicle is in one of the other modes of operation using a different calibration table stored in system memory and indicating a different relationship of torque output as a function of the accelerator pedal position and the speed parameter.

8. An electronic control system for a vehicle drive providing a torque output in response to driver demand, comprising:

a calibration table stored in system memory for controlling torque output of one of an engine and transmission of said vehicle for a 4×4 mode of the vehicle drive and indicating a relationship of torque output as a function of accelerator pedal position and a speed parameter for reducing sensitivity of torque output to accelerator pedal position in the 4×4 mode of operation, and, a different calibration table stored in system memory for controlling torque output of one of the engine and the transmission of said vehicle for another mode of operation of the vehicle drive and indicating a different relationship of torque output as a function of the accelerator pedal position and the speed parameter.

9. The system of claim 8 wherein the torque output of said calibration table comprises a transmission output shaft torque value for the 4×4 mode of an automatic transmission.

10. The system of claim 9 wherein said 4×4 mode is a 4×4 low mode of operation.

11. The system of claim 8 wherein said different calibration table indicates a relationship of engine torque output as a function of the accelerator pedal position and the speed parameter.

* * * * *